C. B. ARNOLD.
HAND CORN PLANTER.
No. 10,785. Reissued Nov. 30, 1886.
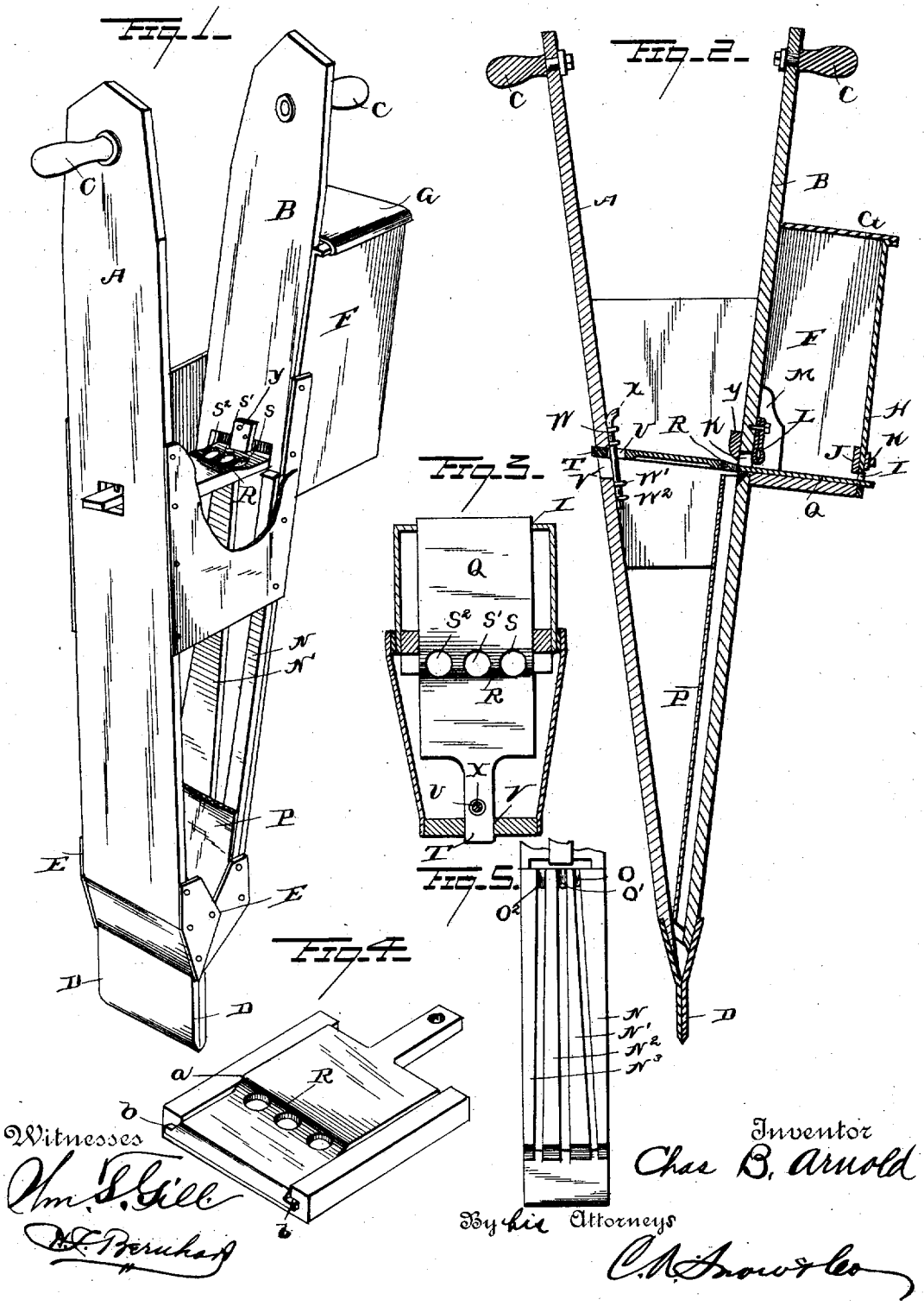
N. PETERS, Photo-Lithographer, Washington, D. C.

UNITED STATES PATENT OFFICE.

CHARLES B. ARNOLD, OF GLENCOE, KENTUCKY.

HAND CORN-PLANTER.

SPECIFICATION forming part of Reissued Letters Patent No. 10,785, dated November 30, 1886.

Original No. 315,881, dated April 14, 1885. Application for reissue filed August 30, 1886. Serial No. 212,280.

*To all whom it may concern:*

Be it known that I, CHARLES B. ARNOLD, a citizen of the United States, residing at Glencoe, in the county of Gallatin and State of Kentucky, have invented a certain new and useful Improvement in Hand Corn-Planters, of which the following is a specification, reference being had to the accompanying drawings.

My invention relates to improvements in hand corn-planters; and it consists of the peculiar construction, combination, and arrangement of the various parts for service, substantially as hereinafter fully set forth, and particularly pointed out in the claims.

The primary object of my invention is to provide an improved device of the class named which shall separate each grain of corn before it is dropped into the conducting-tubes, and thereby plant the grains of corn in the soil independently and separately of each other, which permits the corn to grow and flourish better than if two or more grains are discharged into each hill, which is the serious objection against devices of this class, because when the corn is deposited in the soil in a heap it will not grow well and cannot be thinned out or separated.

A further object of my invention is to provide a corn-planter that shall possess superior advantages in point of simplicity, cheapness, durability, and general efficiency over others of its class; and a further object is to provide an improved seed-slide which shall separate and drop the grains of corn with great accuracy and exactness, and which shall also be very easy and effective in operation.

Heretofore it has been proposed to provide a hand corn-planter with a seed-slide having a single seed opening or cup and an elevated shoulder arranged some distance in rear of the said seed opening or cup; but in a series of tests or experiments of a hand corn-planter with a seed-slide embodying this construction, I have found that the seed or grains of corn will not be discharged with any degree of regularity or accuracy, owing partly to the fact that the shoulder of the slide is located at a point thereon at which it does not act to any appreciable extent or degree on the grains of corn to regulate the quantity of corn entering the opening or cup in the slide. I am aware that a device of this character has been heretofore patented, and the said patented device is further defective in that but a single seed opening or cup is provided in the slide, and no means are employed to prevent too great a number of grains of corn from passing with the slide and the cups thereof through the opening in the hopper, the discharge in this instance varying greatly; but I do not wish to be understood as broadly claiming the use of a sweep for this purpose.

In my improved corn-planter I employ a seed-slide having an elevated shoulder or ledge with a beveled or inclined rear face on the upper working-surface of the slide, and a series of three or more seed cups or openings are formed in the slide transversely thereof, and which extend into the beveled or inclined face of the elevated shoulder or ledge, the shoulder being raised or elevated above the reduced portion of the rear of the seed-slide a distance less than the average diameter of an ordinary-sized grain of corn, to permit the latter to fall on the reduced portion of the slide and enter the openings or cups therein. Only one grain of corn at a time enters each of the seed cups or openings in the slide, and the sweep is located immediately in front of the discharge-opening in the hopper, to prevent the slide from carrying the corn with it, except those grains within the pockets thereof, during its retrograde movement to discharge the corn from the pockets.

In the said patented device hereinbefore referred to, the elevated shoulder of the slide is inclosed within the hopper at all times, and during the retrograde movement of the slide the shoulder has a tendency to push the grains of corn toward the discharge-opening in the hopper and force them through the said opening with the slide, and thus discharge too great a number or quantity of corn; and the said shoulder of the slide obstructs the passage of the slide in the corn, and thus increases the resistance of the slide in its retrograde movement.

In my improved device I arrange the elevated shoulder or ledge on the slide so that it is successively forced into and drawn out of the hopper in advance of the seed-cups, and by this means the shoulder offers no obstruction to the free withdrawal of the slide, the lower free edges of the sweep terminating above and out of contact with the elevated portion or shoulder of the slide, so that when the reduced portion of the slide is withdrawn from the hopper the corn in the latter and on the said reduced portion of the slide will strike against the lower edges of the sweep, which is of sufficient rigidity to resist the pressure of the corn and prevent the escape of the latter from the hopper with the slide. I also provide an independent conveying tube or passage for the grain of corn dropped by each cup or opening in the reciprocating slide, so that the grains are discharged into the soil independently of each other and a short distance apart.

In the drawings, Figure 1 is a view in perspective of my improved corn-planter, a portion of the fabric that connects the legs together, and also a portion of the fabric that connects the seed-tubes, being broken away. Fig. 2 is a vertical sectional view, and Fig. 3 is a horizontal sectional view above the seed-slide. Fig. 4 is a detail view of a modification of the seed-slide. Fig. 5 is a detail view of the tapering strips.

Referring by letter to the accompanying drawings, A B designate the legs of the planter, which are provided with handles C C at their upper ends, and at their lower ends with blades D D, having inturned flanges E E, by which they are hinged or pivoted together in such a manner as to be capable of being opened and closed in the usual manner.

F is the box or hopper, which is rectangular in form, and is secured to the leg B. The hopper F is provided with a sliding lid, G, and just above its bottom, in its outer wall, H, it is provided with a transverse opening, I, extending nearly across said wall. To the inner face of said wall H, and projecting slightly below the upper edge of the transverse opening I, is a transverse wooden strip, J, which is secured in place by two screws, K, passed through washers and holes in the wall H into said strip J. The bottom of the hopper is of wood. The leg B forms the front side of the hopper, and is provided with a transverse opening, K′. Within the hopper, and secured to the face of the leg B above the transverse opening K′ in such manner as to project down and partially close said opening K′, are the sweeps L, composed of rolled rubber or leather, which, when the planter is in operation, rest upon the seed-slide and rake the corn into the seed-tubes.

Guide-cleats M are provided at the ends of the sweeps of rolled rubber or leather sections, and are secured to the leg B, there being but two of the said cleats. The leg B is provided on its inner face—that is, the face opposite the hopper—with four tapering strips, N N′ $N^2$ $N^3$, of wood, which are securely nailed thereto and extend from the lower edge of the transverse opening K to the lower end of the wooden portion of the leg B. The two outer strips, N $N^3$, are widest at their upper end and taper toward their lower end, their outer edges being straight and flush with the outer edges of the leg B. The two inner strips, N′ $N^2$, are widest at their lower ends. Their adjacent edges are straight, and the edges farthest apart are tapered. The lower ends of the intermediate strips, N′ $N^2$, are beveled on both faces to form points thereon. Between the upper ends of the outer and intermediate strips the leg B is gouged from the transverse opening K downwardly for short distances to form mouths for the three seed-tubes O O′ $O^2$, formed between the tapering strips. The seed-tubes are formed by covering the tapering strips and the spaces between them with a piece of fabric, P, of oil-cloth or other like material. The fabric is secured in place by tacks, and extends from the upper ends of the strips to the commencement of the bevels on the lower ends of the intermediate strips. The upper connection between the legs A and B is made by securing two slightly downward-tapering pieces of oil-cloth or other suitable material to the sides of the hopper by screws, and below the hopper to the edges of the legs by tacks in a firm manner. The seed-slide Q is of double length—that is, it passes entirely through the hopper and projects through the transverse opening in the hopper-wall H. The free end of the slide Q is never drawn entirely within the hopper during the operation of the planter.

The seed-slide Q is of copper or malleable cast-iron, preferably, and is polished on its upper surface to insure easy and accurate working in its guides. This slide has an offset or raised portion on its upper working-surface, as shown at R, and in rear of this raised portion R are three seed-openings, S S′ $S^2$, arranged in line with each other and transversely of the slide. These seed-openings cut or intersect slightly into the offset R, and the offset is beveled downward and rearward to insure the entrance of the corn to the seed-openings. While the seed-openings are over the bottom of the hopper they form seed-cups, but when over the seed-tubes they form openings through which the corn drops into the seed-tubes. The middle seed-tube, O′, is straight and discharges at the middle of the bottom of the planter. The seed-tubes O and $O^2$ incline outwardly and discharge on opposite sides of the middle tube, O′. The seed-cups hold one grain of corn each. The seed-slide Q has an integral horizontal stem, T, provided near its outer end with a vertical perforation, U. This stem T passes into a rectangular opening, V, in the leg A, directly opposite the transverse opening in the leg B, and the leg A is provided on its inner face above and below the opening V with staples W W′ $W^2$. A hook-rod, X, having the hook at its upper end, is passed down through the uppermost staple, W, through the vertical perforation U in the stem T, and through the staples W′ $W^2$, and forms the fastening for the seed-slide. A guide and stop block, *y*, is secured to the leg B above the transverse opening K at the middle of the leg, and projects down part way over the said opening K. This block serves as a guide for the seed-slide.

In the modification the seed-slide is cut off a short distance in front of the seed-cups, and its rear edge is beveled downward and rearward, as shown at *a*. Its side edges are provided with tongues, as shown at *b*, and the transverse opening I in the wall H of the hopper is omitted, and the bottom of the hopper is provided with grooves for the tongues *b*. In other respects the planter is constructed as hereinbefore described.

I attach especial importance to the reciprocating seed-slide Q, having an offset or raised shoulder, R, on its upper working-surface, and to having the three openings or seed-cups located in rear of the shoulder and cutting or intersecting with the said shoulder, combined with a sweep or sweeps arranged above the slide and terminating above the raised portion of the seed-slide, so that it is out of contact with the slide and just bears upon the elevated portion of the same, and an independent tube or passage for each cup of the seed-slide. As before described, the shoulder or offset is of a depth equal to or a little less than the average diameter of a grain of corn, and by this means and the peculiar form of the sweep I am enabled to prevent the seed from escaping with the slide in the retrograde movement of the latter, and also insure greater accuracy and efficiency of the slide in grains of the corn, while by means of the independent tubes the grains of corn are discharged and planted separately and at proper intervals apart from each other.

From the foregoing description, taken in connection with the drawings, the operations of the hand-planter will be readily understood without further explanation.

Having thus fully described my invention, what I claim as new, and desire to secure by Letters Patent of the United States, is—

1. The combination, in a hand corn-planter, with the leg B, provided with the strips N $N^3$ at opposite sides on its inner face, tapering to a point from above downward, of the intermediate strips, N′ $N^2$, tapering from below upward, and the fabric P, for covering the strips to form the seed-tubes, as set forth.

2. In a hand corn-planter, the combination, with the pivoted legs and a hopper carried by one of the legs, of a seed-slide connected with and reciprocated by one of the legs, and having an elevated transverse offset or shoulder on its upper working-surface provided with an inclined rear face, and a series of vertical seed openings or cups arranged in line with each other transversely of the slide and cutting or intersecting into the said offset thereon, a sweep inclosed within the hopper above the seed-slide, and terminating at its lower end a slight distance above or in contact with the elevated offset of the said slide, and the independent conveyer passages or tubes for the grains of corn, substantially as described, for the purpose set forth.

3. In a hand corn-planter, the combination, with the legs and a hopper, of a reciprocating slide working in the hopper, and having an offset or shoulder arranged transversely thereof on its upper working-surface and at an intermediate point of its length, the said offset having an inclined face, and the vertical seed cups or openings arranged across the slide and cutting or intersecting into the offset, and a sweep terminating at a point above or in contact with the upper side of the offset on the slide, substantially as described, for the purpose set forth.

In testimony that I claim the foregoing as my own I have hereto affixed my signature in presence of two witnesses.

CHARLES B. ARNOLD.

Witnesses:

DAVID B. WALLACE,
JAS. R. WALLACE.